United States Patent [19]

Fleck et al.

[11] 3,860,331

[45] Jan. 14, 1975

[54] SOUND PROJECTOR FOR MOTION PICTURE FILM

[75] Inventors: Werner Fleck, Winterbach; Erwin Weinbrecht, Stuttgart; Gerhard Börner, Waldenburg, all of Germany

[73] Assignee: Robert Bosch Photokino G.m.b.H., Stuttgart, Germany

[22] Filed: Mar. 15, 1974

[21] Appl. No.: 451,592

[30] Foreign Application Priority Data

Mar. 29, 1973 Germany............................ 2315627

[52] U.S. Cl.................... 352/14, 352/158, 352/159, 352/155
[51] Int. Cl. .......................................... G03b 31/00
[58] Field of Search ............. 352/14, 157, 158, 159, 352/155

[56] References Cited
UNITED STATES PATENTS

| | | |
|---|---|---|
| 3,201,020 | 8/1965 | Cherniavskys................. 352/158 X |
| 3,201,796 | 8/1965 | Michaels......................... 352/157 X |
| 3,609,022 | 9/1971 | Schwartz......................... 352/159 X |

*Primary Examiner*—Monroe H. Hayes
*Attorney, Agent, or Firm*—Michael S. Striker

[57] ABSTRACT

A sound projector for motion picture film wherein the standard distance between film frames and the corresponding portions of the sound track is maintained during rewinding of film onto the supply reel, even if the film is damaged in the region of several successive perforations. The film which is being withdrawn from the takeup reel engages a sprocket prior to passing around a drum forming part of the sound reproducing unit. The film thereupon reengages the sprocket before it reaches the film gate. Two spring-biased rollers tension the film between the drum and the sprocket. When the motor for the sprocket is operated in reverse, a slide engages and holds the shafts of tensioning rollers in predetermined positions to thus insure that a portion of recorded sound is adjacent to the drum while the corresponding film frame registers with the film gate.

17 Claims, 1 Drawing Figure

PATENTED JAN 14 1975
3,860,331
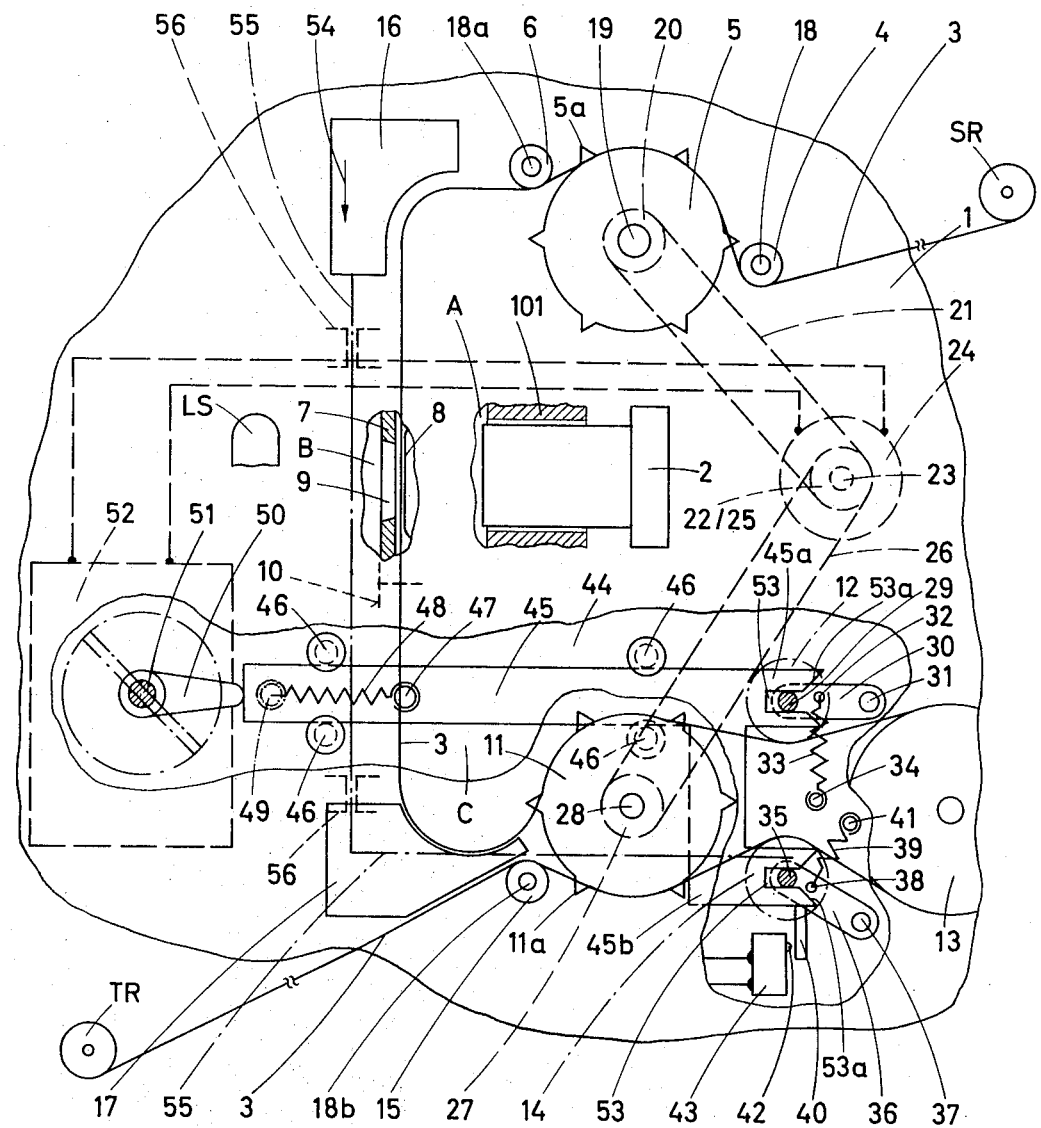

SOUND PROJECTOR FOR MOTION PICTURE FILM

BACKGROUND OF THE INVENTION

The present invention relates to motion picture projectors, and more particularly to improvements in sound projectors for simultaneous reproduction of visual and audio information which is recorded on motion picture film.

In certain presently known sound projectors for motion picture film, an automatic threading mechanism advances the film from the supply reel, partially around a first driven sprocket, past the film gate, thereupon partially around a second driven sprocket, around a drum of the sound reproducing unit, again partially around the second sprocket, and on to the takeup reel. At least one tensioning roller engages the film between the second sprocket and the drum and serves the additional purpose of arresting the film transporting mechanism when the length of the film loop between the second sprocket and the drum exceeds a predetermined value. The just described sound projector is capable of advancing motion picture film which is damaged in the region of one or more perforations, as long as the number of successive defective perforations does not exceed the number of sprocket teeth which engage the film upstream or downstream of the film gate and or the number of teeth on the pull-down.

The film frames are spaced apart from the corresponding portions of the sound track by a standard distance, for example, by a distance corresponding to the combined length of 18 frames. This standard distance imposes limits on the diameter of the second sprocket as well as on the length of that portion of motion picture film which is looped around the second sprocket. Thus, the number of those teeth on the second sprocket which simultaneously engage and advance the film is also determined by the aforementioned standard distance between film frames and the corresponding portions of the sound track.

In most presently known sound projectors, the number of those teeth on the second sprocket which engage the film is less than the number of film-engaging teeth on the first sprocket and/or pull-down. Therefore, defects of the film in the region of its perforations are detected first when the defective film portion reaches the second sprocket. The length of the loop between the second sprocket and the drum of the sound reproducing unit increases when the teeth of the second sprocket are incapable of properly engaging and advancing a defective portion of the film. This results in such displacement of the aforementioned tensioning roller or rollers that they automatically arrest the motor to avoid further damage to the film and/or damage to the projector. As a rule, one of the two tensioning rollers automatically opens a switch in the circuit of the motor to interrupt the forward movement of film, i.e., to interrupt further withdrawal of film from the supply reel.

Presently known sound projectors further comprise a knob which is depressed or otherwise displaced in order to start the automatic threading operation. The same knob is actuated in order to initiate the start of renewed forward transport of motion picture film subsequent to automatic stoppage when a defective film portion reaches the second sprocket. Such projectors normally employ a reversible motor which enables the user to rewind a portion of the film onto the supply reel prior to renewed viewing of a selected series of film frames and/or to rerecord the sound on an older film. However, the aforementioned tensioning roller or rollers again automatically arrest the film as soon as the defective film portion reaches the second sprocket. This will be readily understood since the teeth of the second sprocket cannot properly engage the damaged film portion so that at least one of the spring-biased tensioning rollers can increase the size of the loop to an extent which is necessary to open the switch and to thereby arrest the motor during transport of motion picture film from the takeup reel toward the supply reel. Renewed starting of the motor in response to actuation of the aforementioned knob is not a satisfactory solution because the film is merely pulled from but is not pushed toward the sound drum so that the distance between film frames and the corresponding portions of the sound track then deviates from the standard value. Moreover, abrupt tensioning of film in the region of its defective portion in response to a resumption of the film transport in reverse in likely to result in tearing of film and/or in damage to the sound reproducing unit.

SUMMARY OF THE INVENTION

An object of the invention is to provide a sound projector for motion picture film wherein a film which is damaged in the region of one or more perforations can be transported forwardly or rearwardly without affecting the synchronization of image and sound reproduction.

Another object of the invention is to provide a sound projector with novel and improved means for positioning one or more tensioning rollers during rewinding of film onto the supply reel.

A further object of the invention is to provide a sound projector wherein the film can be rewound onto the supply reel without interruptions even if the film is damaged in the region of several successive perforations to such an extent that the damaged portion causes an automatic stoppage of film during transport toward the takeup reel.

An additional object of the invention is to provide a sound projector wherein an uninterrupted transport of damaged film is insured in automatic response to starting of the prime mover in a direction to advance the film toward the supply reel.

The invention is embodied in a sound projector for motion picture film which is transported lengthwise between a supply reel and a takeup reel and wherein the film frames and the corresponding portions of recorded sound are spaced apart by a predetermined distance, as considered in the longitudinal direction of the film. The sound projector comprises a housing, a film gate which is installed in the housing behind a projector lens and in front of a light source, a sprocket which is mounted in the housing downstream of the film gate, as considered in the direction of film transport toward the takeup reel, and which is rotatable in first and second directions to thereby respectively advance the film toward the takeup reel and toward the film gate, preferably reversible prime mover means mounted in or on the housing and being operable to rotate the sprocket in a selected direction, sound reproducing means including a member (e.g., a rotary drum) over which the film is trained in the housing downstream of the sprocket, means (e.g., a guide roller mounted in the housing) for engaging the film with the sprocket downstream of the member of the sound reproducing means (i.e., between the takeup reel and the member), one or more tensioning elements movably mounted in the housing to engage and loop the film between the sprocket and the member, and positioning means provided in the housing for maintaining the tensioning element or elements in a predetermined position at least when the sprocket rotates in one of the two directions (preferably in the second direction) whereby the tensioning element or elements insure that a portion of recorded sound is adjacent to the member while the corresponding film frame registers with the film gate. This insures that a defective portion of motion picture film can be advanced past and beyond the sprocket during transport of film toward the supply reel even if such defective portion includes several successive damaged perforations whose number may equal to the number of sprocket teeth which normally engage the film between the member of the sound reproducing means and the takeup reel.

The positioning means may comprise a reciprocable slide which is moved to an operative position of engagement with the tensioning element or elements in response to setting of a master switch to a position in which the prime mover means is operated in reverse so that the sprocket rotates in the second direction. If the sound projector comprises two tensioning elements which are respectively located upstream and downstream of the member of the sound reproducing means, the slide may comprise two recesses in the form of open-ended slots each of which receives a portion of a different one of the tensioning members in the operative position of the slide.

The novel features which are considered as characteristic of the invention are set forth in particular in the appended claims. The improved sound projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary schematic partly elevational and partly sectional view of a sound projector which embodies the invention, the positioning means for the tensioning elements being shown in its operative position.

DESCRIPTION OF THE PREFERRED EMBODIMENTS

The drawing shows a portion of a sound projector for motion picture film 3 having at least one row of perforations (not specifically shown) and at least one sound track. When a given frame of film 3 is in register with the window 9 of a gate 7 behind a projector lens 2 in a projector housing 1, the corresponding portion of the sound track must be in a predetermined position with respect to a rotary drum 13 forming part of a conventional sound reproducing unit. This insures a satisfactory synchronization of image reproduction (projector lens 2) and sound reproduction (drum 13). Consequently, the length of the portion of film 3 between the window 9 and the drum 13 cannot be changed at will but must remain at least substantially constant.

The housing 1 of the sound projector is broken away at A, B and C to respectively reveal a guide 101 for the projector lens 2, a pressure plate 8 which urges the film against the gate 7 or cooperates with the gate to maintain the film frame behind the lens 2 in a predetermined plane, and a slide-like positioning device 45 (hereafter called slide for short) which can engage and locate the pins or shafts 29, 35 of two tensioning rollers 12, 14.

In normal operation, the film 3 is being withdrawn from a schematically shown supply reel SR and is being collected by a schematically shown takeup reel TR. During movement from the supply reel to the takeup reel, successive increments of the film 3 advance along a predetermined path whereby such increments move along and are engaged by a first guide roller 4 mounted in the housing 1 on a fixed shaft 18, thereupon by a first driven sprocket 5 mounted on a shaft 19, by a second guide roller 6 mounted on a fixed shaft 18a, by a second driven sprocket 11 mounted on a shaft 28, by the first tensioning roller 12, by the drum 13 of the sound reproducing unit, by the second tensioning roller 14, again by the second driven sprocket 11, and finally by a third guide roller 15 mounted on a fixed shaft 18b. The roller 15 constitutes a means which (in cooperation with the roller 14 and/or drum 13) causes the film 3 to engage the underside of the sprocket 11. That portion of the film 3 which extends between the guide roller 6 and the second driven sprocket 11 passes through the space between the gate 7 and pressure plate 8. The window 9 in the gate 7 is located in front of a suitable light source LS. A pull-down or intermittent 10 with three teeth is mounted in the region of the window 9 to advance the film 3 stepwise whereby each of its three teeth extends into a different perforation of the film.

The guide means for the film 3 further comprises two normally stationary guide members 16 and 17 here shown as loop formers the first of which guides the film between the roller 6 and the pressure plate 8 and the second of which guides the film between the pressure plate and the second driven sprocket 11.

The drive means for the sprockets 5 and 11 comprises a reversible prime mover 24 here shown as an electric motor having an output shaft 23 which rotates two sprocket wheels 22 and 25. The sprocket wheel 22 drives a sprocket wheel 20 on the shaft 19 of the first driven sprocket 5 through the medium of a first chain 21, and the sprocket wheel 25 drives a sprocket wheel 27 on the shaft 28 of the second driven sprocket 11 through the medium of a second chain 26.

The shaft 29 for the first tensioning roller 12 is mounted on a support here shown as a lever 30 which is pivotably carried by a fixed pivot member 31 of the housing 1 and has a small hole 32 for one end of a helical spring 33. The other end of the spring 33 is attached to a fixed post 34, and this spring tends to pivot the lever 30 counterclockwise so that the roller 12 bears against the film 3 between the second driven sprocket 11 and the drum 13.

The shaft 35 for the second tensioning roller 14 is mounted on a lever or support 36 which is pivotably carried by a fixed pivot member 37 and has a hole 38 for one end of a helical spring 39 the other end of which is attached to a fixed post 41. The spring 39 biases the lever 36 clockwise so that the roller 14 bears against the film 3 between the drum 13 and sprocket 11.

The lever 36 has a projection or lug 40 which constitutes an actuating means or trip for the movable portion 42 of a normally closed electric switch 43. The latter is in circuit with and serves to arrest the motor 24 when the movable portion 42 is engaged and depressed by the projection 40, i.e., when the length of the looped portion of film 3 between the drum 13 and the second driven sprocket 11 reaches a predetermined maximum value so that the tensioning element or device including the parts 14, 35, 36 can assume a predetermined position.

The slide 45 is reciprocable in the housing 1 between two pairs of guide pins 46 having heads which overlie the front side of the slide, as viewed in the drawing. This slide is movable between the illustrated operative position and a retracted or inoperative position. The means for permanently biasing the slide 45 to its inoperative position comprises a helical spring 48 which is attached to a fixed post 49 and to a post 47 on the slide. The left-hand end face of the slide 45 bears against a cam or lug 50 on the rotary selecting shaft 51 of a master switch 52 which can be actuated (by rotating the shaft 51 through the medium of a knob or the like, not shown) to arrest the motor 24, to start the motor in a forward direction, or to reverse the direction of rotation of the motor. The slide 45 abuts against and is movable with respect to a fixed supporting plate 44 which carries the guide pins 46.

The right-hand portion of the slide 45 is forked to form two prongs or arms 45a, 45b each of which has an open-ended recess or slot 53 bounded at its open end by a pair of outwardly flaring surfaces 53a to form a funnel or inlet for entry of the shafts 29 and 35 when the selecting shaft 51 is rotated to the illustrated angular position so that the post 47 stresses the spring 48 while the cam 50 moves the slide 45 to the illustrated operative position. The longitudinal directions of the slots 53 are normal to the axes of the tensioning rollers 12, 14.

The distance between the centers of the two slots 53 equals the distance between the axes of the shafts 29, 35 during normal operation of the projector, i.e., when the tensioning action of the rollers 12, 14 is such that the length of looped film portions between the second driven sprocket 11 and the drum 13 is within an optimum range.

The stationary guide member 16 is depressible and this constitutes a knob which can cause a power train 55 (e.g., a linkage) to disengage the projection 40 of the lever 36 from the movable portion 42 of the arresting switch 43. The parts of the power train 55 are guided in suitable bearing members 56. The arrow 54 indicates the direction in which the guide member 16 should move to effect a closing of the switch 43. The drawing shows the member 16 in its starting or retracted position. This member 16 forms part of the automatic film threading mechanism.

The guide rollers 4 and 6 are positioned in such a way that the film portion which is looped around the first sprocket 5 is always engaged by three teeth 5a each of which extends into a different perforation. Also, the guide member 17 cooperates with the tensioning roller 12 to normally engage the film 3 with three successive teeth 11a of the sprocket 11 (at a level above the sprocket 11, as viewed in the drawing). On the other hand, the film portion which extends between the rollers 14 and 15 is engaged only by two successive teeth 11a.

Automatic threading of the leader of a film 3 begins when the leader is trained over the guide roller 4 and against the sprocket 5 so that at least one of the teeth 5a extends into the adjacent perforation. The threading is initiated by the member 16 and is effected by the sprocket 5 which is then rotated counterclockwise by the pull-down 10, and by the sprocket 11 which then rotates clockwise. The leader can be automatically attached to the core of the takeup reel TR.

The operation is as follows:

During forward transport of the film 3, the selecting shaft 51 assumes an angular position in which the slide 45 is retracted by the spring 48 so that the slots 53 are moved away from and release the shafts 29 and 35. This enables the springs 33, 39 to urge the respective tensioning rollers 12, 14 against the film 3 in the regions upstream and downstream of the drum 13. The motor 24 drives the sprockets 5, 11 continuously and moves the pull-down 10 back and forth so that the latter transports the film 3 stepwise in order to place successive film frames into temporary register with the window 9. The motor 24 also drives the takeup reel TR in a direction to collect the film. The driven sprocket 5 draws the film from the supply reel SR.

If a portion of the film 3 is defective in the region of two successive perforations, the switch 43 automatically arrests the motor 24 in the following way: The defective film portion can move along and beyond the first driven sprocket 5 because the film is engaged by three successive teeth 5a. Furthermore, the defective portion of film 3 can move beyond the pull-down 10 because the latter comprises more than two prongs or teeth which are arranged to enter simultaneously an equal number of successive perforations. Still further, the defective portion can advance beyond the upper side of the driven sprocket 11 because the film 3 is engaged by three successive teeth 11a. However, when the defective portion reaches the underside of the sprocket 11, it cannot be entrained toward the guide roller 15 because the film 3 is normally engaged only by two successive teeth 11a on its way from the tensioning roller 14 toward the guide roller 15. Consequently, the spring 39 pivots the lever 36 clockwise to lengthen the loop between the drum 13 and sprocket 11 so that the projection 40 opens the switch 43 to thereby arrest the motor 24.

The interruption of film transport from the supply reel SR toward the takeup reel TR prevents further damage to the film 3, for example, due to piling up of film between the drum 13 and sprocket 11. The film 3 can be set in motion by depressing the guide member 16 (arrow 54), the same as during threading of the leader of a fresh film through the projector. This causes the linkage 55 to pivot the lever 36 counterclockwise so that the projection 40 allows the switch 43 to complete the circuit of the motor 24 whereby the sprockets 5, 11 begin to rotate and the pull-down 10 transports the film stepwise. An oncoming tooth 11a finds a satisfactory perforation of the film downstream of the tensioning roller 14 and begins to advance the film toward the guide roller 15 and takeup reel TR.

If the operator of the projector wishes to repeat the projection of a series of images, the film 3 must be transported in reverse. In a conventional projector, the rearward transport of film would be interrupted as soon as the damaged portion of the film would reach the lower part of the sprocket corresponding to the sprocket 11. If the operator would attempt to set the film in motion (rearwardly) by depressing the guide member 16 in the direction of arrow 54, i.e., the same as when the defective portion reaches the lower part of the sprocket 11 during forward transport of the film, this would cause the sprocket 11 to skip at least one perforation. Thus, the transport of film 3 in a direction toward the supply reel SR would be resumed with a delay corresponding to that required to transport the film through a distance corresponding to n spacings between two neighboring perforations wherein n includes one. This would result in absence of synchronization between image and sound reproduction during renewed transport of film toward the takeup reel TR.

It was further found that, in a conventional projector, a damaged film portion including two successive perforations can result in tearing of film in response to renewed starting of the projector. The reason for such tearing is believed to be the enlarged loop which is formed by the tensioning roller 14 in response to transport of a damaged film portion into the region of teeth at the underside of the sprocket 11. Assume that the guide member 16 is depressed to close the switch 43 in the aforedescribed manner so that the motor 24 can continue to effect a movement of motion picture film 3 toward the supply reel SR, the aforementioned loop is initially free, i.e., not under tension, while its size is being reduced by the sprocket 11 which rotates counterclockwise. The film returns abruptly into engagement with teeth 11a at the underside of the sprocket 11 as soon as the loop is reduced sufficiently to engage the tensioning roller 14. Such abrupt stressing often (and almost invariably) results in further damage to or complete breakage of film, especially since the stress is applied to a damaged portion.

In accordance with the invention, the film is restarted in reverse by rotating the selecting shaft 51 of the master switch 52 to the illustrated position whereby the cam 50 moves the slide 45 to the operative position and the slots 53 receive the shafts 29 and 35. The entry of shafts 29 and 35 into the respective slots 53 is facilitated due to the provision of inclined surfaces 53a at the open ends of the slots. The switch 43 is allowed to close and the maximum length of film between the sprocket 11 and drum 13 is determined by the positions of the tensioning rollers 12, 14. Thus, as the sprocket 11 again begins to rotate clockwise, the film begins to advance toward the supply reel SR and the damaged portion moves beyond the lower teeth 11a of the sprocket 11. The lower teeth 11a automatically enter satisfactory perforations when the film portion which is looped around the drum 13 and extends between the rollers 12, 14 reaches the illustrated length. Therefore, the damaged portion is not subjected to any abrupt and substantial stresses. Also, the required distance between the film frames and the corresponding portions of the sound track remains unchanged.

When the supply reel SR collects a desired length of film, the selector shaft 51 is rotated to start the motor 24 in a forward direction whereby the spring 48 automatically retracts the slide 45 to the inoperative position and the roller 14 is again ready to open the switch 43 as soon as the damaged portion of the film reaches the underside of the sprocket 11.

It is also within the purview of the invention to omit the tensioning roller 12 or to construct the slide 45 in such a way that it can engage and arrest portions of the levers 30, 36 in order to maintain the rollers 12, 14 in the predetermined positions which are shown in the drawing.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a sound projector for motion picture film which is transported lengthwise between supply and takeup reels and wherein the film frames and the corresponding portions of recorded sound are spaced apart by a predetermined distance, a combination comprising a housing; a film gate in said housing; a sprocket mounted in said housing downstream of said gate, as considered in the direction of film transport toward the takeup reel, and being rotatable in first and second directions to respectively advance the film toward the takeup and supply reels; prime mover means for said sprocket; sound reproducing means including a member over which the film is trained in said housing downstream of said sprocket; means in said housing for engaging the film with said sprocket downstream of said member; at least one tensioning element movably mounted in said housing to engage the film between said sprocket and said member; and positioning means provided in said housing for maintaining said tensioning element in a predetermined position when said sprocket rotates in at least one of said directions, whereby said tensioning element insures that a portion of recorded sound is adjacent to said member while the corresponding film frame registers with said gate.

2. A combination as defined in claim 1, further comprising automatic threading means for advancing the leader of film from the supply reel to the takeup reel along a predetermined path extending past said gate, past said sprocket, around said member, past said tensioning element, again past said sprocket and on to the takeup reel, said member of said sound reproducing means being rotatable in said housing and said tensioning element comprising a roller which is normally biased against the film between said member and said sprocket.

3. A combination as defined in claim 1, wherein said tensioning element is biased against the film between said member and said sprocket and is movable to a second predetermined position in response to excessive slackening of film between said sprocket and said member, and further comprising means for arresting said prime mover means in response to movement of said tensioning element to said second predetermined position.

4. A combination as defined in claim 3, wherein said tensioning element is a roller.

5. A combination as defined in claim 1, wherein said tensioning element comprises a roller and a spring-biased support for said roller, said positioning means comprising means for engaging said support when said sprocket rotates in said one direction.

6. A combination as defined in claim 1, further comprising means for selecting the direction of operation of said prime mover means, said means for selecting including means for engaging said positioning means with said tensioning element in response to actuation of said prime mover means to rotate said sprocket in said second direction.

7. A combination as defined in claim 6, wherein said prime mover means comprises an electric motor and said means for selecting comprises a switch in circuit with said motor.

8. A combination as defined in claim 7, wherein said switch has a portion movable between three positions in the first of which said motor is idle, in the second of which said motor drives said sprocket in said first direction, and in the third of which said motor drives said sprocket in said second direction and said positioning means maintains said tensioning element in said predetermined position.

9. A combination as defined in claim 6, wherein said means for engaging said positioning means with said tensioning element comprises a cam.

10. A combination as defined in claim 1, wherein said positioning means is reciprocable to and from an operative position and has a recess which receives a portion of said tensioning element in said operative position to thereby maintain said tensioning element in said predetermined position.

11. A combination as defined in claim 10, wherein said tensioning element includes a film-engaging roller and said recess in an open-ended slot extending substantially at right angles to the axis of said roller.

12. A combination as defined in claim 11, wherein said portion of said tensioning element is a shaft for said roller.

13. A combination as defined in claim 11, wherein the open end of said slot is funnel-shaped and diverges in the direction of movement of said positioning means toward said operative position to facilitate the entry of said portion of said tensioning element into said slot.

14. A combination as defined in claim 10, wherein said recess has a single open end to allow for entry of said portion of said tensioning element in response to movement of said positioning means to said operative position.

15. A combination as defined in claim 1, wherein said positioning means is movable to and from an operative position of engagement with said tensioning element, and further comprising a cam actuatable to move said positioning means to said operative position in response to operation of said prime mover means to rotate said sprocket in said second direction and means for biasing said positioning means against said cam.

16. A combination as defined in claim 1, comprising a plurality of tensioning elements, said positioning means including means for maintaining each of said tensioning elements in a predetermined position in response to rotation of said sprocket in said one direction.

17. A combination as defined in claim 16, wherein one of said tensioning elements engages the film upstream and another of said tensioning elements engages the film downstream of said member, as considered in the direction of film transport toward the takeup reel.

* * * * *